United States Patent
Larsen et al.

(10) Patent No.: US 12,438,764 B2
(45) Date of Patent: Oct. 7, 2025

(54) ACTUATING AN IOT DEVICE ON A FLUID TANK OR GAS USAGE DEVICE REMOTE MONITORING NETWORK

(71) Applicant: Whammy, Inc., Millbrook, NY (US)

(72) Inventors: Grant Kenji Larsen, Millbrook, NY (US); Andrew Heaney, Millbrook, NY (US)

(73) Assignee: Whammy, Inc., Millbrook, NY (US)

( * ) Notice: Subject to any disclaimer, the term of this patent is extended or adjusted under 35 U.S.C. 154(b) by 0 days.

(21) Appl. No.: 18/153,915

(22) Filed: Jan. 12, 2023

(65) Prior Publication Data
US 2023/0231757 A1 Jul. 20, 2023

Related U.S. Application Data

(60) Provisional application No. 63/299,534, filed on Jan. 14, 2022, provisional application No. 63/299,536, filed on Jan. 14, 2022.

(51) Int. Cl.
| | |
|---|---|
| *H04L 41/04* | (2022.01) |
| *G16Y 10/35* | (2020.01) |
| *G16Y 40/10* | (2020.01) |
| *G16Y 40/30* | (2020.01) |

(52) U.S. Cl.
CPC .............. *H04L 41/04* (2013.01); *G16Y 10/35* (2020.01); *G16Y 40/10* (2020.01); *G16Y 40/30* (2020.01)

(58) Field of Classification Search
CPC ..... H04L 41/04; H04L 41/0816; G16Y 10/35; G16Y 40/10; G16Y 40/30
See application file for complete search history.

(56) References Cited

U.S. PATENT DOCUMENTS

| | | | |
|---|---|---|---|
| 2006/0242285 A1 | 10/2006 | Moriwaki | |
| 2010/0271199 A1* | 10/2010 | Belov | G01M 5/00 340/539.3 |
| 2015/0059468 A1 | 3/2015 | Humphrey | |
| 2015/0142945 A1* | 5/2015 | Brandt | H04L 12/6418 709/223 |
| 2015/0159887 A1 | 6/2015 | Kadah et al. | |

(Continued)

FOREIGN PATENT DOCUMENTS

| | | |
|---|---|---|
| AU | 2012244083 A1 | 11/2012 |
| WO | 2023137393 A1 | 7/2023 |

(Continued)

OTHER PUBLICATIONS

International Search Report and Written Opinion dated Jun. 14, 2023 cited in Application No. PCT/US23/60580, 11 pgs.

(Continued)

*Primary Examiner* — Amine Benlagsir
(74) *Attorney, Agent, or Firm* — BEKIARES ELIEZER LLP

(57) ABSTRACT

A network of wireless nodes collects data from a fluid tank or gas usage device sensor and uploads the data to the cloud or the Internet. The network allows for a temporary node to integrate into the network such that technicians can access the network without access to the cloud or internet. Data from the sensor may then be used by the system, either locally or remotely, to control or adjust one or more Internet of Things (IoT) devices based on the values of parameters such as tank fluid level or gas usage, etc.

15 Claims, 8 Drawing Sheets

(56) References Cited

U.S. PATENT DOCUMENTS

| | | | |
|---|---|---|---|
| 2016/0092501 | A1 | 3/2016 | Chakraborty et al. |
| 2017/0040520 | A1 | 2/2017 | Gillette |
| 2017/0261264 | A1 | 9/2017 | Wang et al. |
| 2017/0357926 | A1 | 12/2017 | McSheffrey |
| 2018/0087948 | A1 | 3/2018 | Khandelwal |
| 2019/0296979 | A1* | 9/2019 | Gupta .................... G06N 20/00 |
| 2019/0349727 | A1* | 11/2019 | Gundel .................... H04B 3/54 |
| 2019/0363746 | A1 | 11/2019 | Zalewski et al. |
| 2020/0294694 | A1 | 9/2020 | Bertini et al. |
| 2021/0006623 | A1 | 1/2021 | Joao |
| 2021/0116288 | A1 | 4/2021 | Rego de Oliveira et al. |
| 2021/0117300 | A1* | 4/2021 | Santhar ............... G06F 11/3082 |
| 2021/0241556 | A1 | 8/2021 | Ruane et al. |
| 2021/0374391 | A1 | 12/2021 | Jorasch et al. |
| 2021/0375115 | A1* | 12/2021 | Roy .................... G08B 27/005 |
| 2023/0229663 | A1 | 7/2023 | Larsen et al. |
| 2023/0243690 | A1 | 8/2023 | Larsen et al. |

FOREIGN PATENT DOCUMENTS

| | | | |
|---|---|---|---|
| WO | 2023137413 | A2 | 7/2023 |
| WO | 2023137424 | A2 | 9/2023 |

OTHER PUBLICATIONS

International Search Report and Written Opinion dated Jun. 22, 2023 cited in Application No. PCT/US23/60607, 12 pgs.
International Search Report and Written Opinion dated Jul. 5, 2023 cited in Application No. PCT/US23/60627, 7 pgs.
U.S. Non-Final Office Action dated Jan. 19, 2024 cited in U.S. Appl. No. 18/154,222, 22 pgs.
U.S. Final Office Action dated Jul. 18, 2024 cited in U.S. Appl. No. 18/154,222, 25 pgs.
International Preliminary Report on Patentability dated Jul. 25, 2024 cited in Application No. PCT/US23/60607, 11 pgs.
International Preliminary Report on Patentability dated Jul. 25, 2024 cited in Application No. PCT/US23/60580, 10 pgs.
International Preliminary Report on Patentability dated Jul. 25, 2024 cited in Application No. PCT/US23/60627, 6 pgs.
U.S. Non-Final Office Action dated Jul. 11, 2025 cited in U.S. Appl. No. 18/154,064, 16 pgs.

* cited by examiner

| Sensor ID | Time | Gas | Reported Gas Level | Nearby Gas Devices | Owner Contact |
|---|---|---|---|---|---|
| 1234 | 10:00 AM 8/16/21 | Propane | 1309.00 | 4-burner Propane Stove | wsmith@gmail.com |
| 1234 | 10:15 AM 8/16/21 | Propane | 1457.00 | 4-burner Propane Stove | wsmith@gmail.com |
| 1229 | 10:15 AM 8/16/21 | Carbon Monoxide | 15.93 | Water Heater, Washer, Dryer. | gasman@ipcg.com |
| ... | ... | ... | ... | ... | ... |
| ... | ... | ... | ... | ... | ... |

| Tank ID | Time | Reported Fluid Level | Reported Temp (°) | Tank Model | Tank Capacity (l) | Tank Location | Owner Contact |
|---|---|---|---|---|---|---|---|
| 1234 | 10:00 AM 8/16/21 | 75.25% | 23.45 | CGF-00847-475 | 65.00 | 37.2431° N, 115.7930° W | wsmith@gmail.com |
| 1234 | 10:15 AM 8/16/21 | 75.24% | 23.47 | CGF-00847-475 | 65.00 | 37.2431° N, 115.7930° W | wsmith@gmail.com |
| 1229 | 10:15 AM 8/16/21 | 42.23% | 15.93 | Amerigas 20lb | 16.00 | 44.4603° N, 73.1224° W | gssman@lpg.com |
| . | . | . | . | . | . | . | . |
| . | . | . | . | . | . | . | . |

*FIG. 2B*

| Rule | Commands | Command Description | Device ID |
|---|---|---|---|
| Propane > 2,100ppm | Stoveoff.exe | Turn off a gas stove when propane in the air is above 2100ppm | Stove001 |
| Carbon Monoxide > 200ppm | Ventilationx2.bat | double the power of a ventilator when carbon monoxide is above 200ppm | ventilation hood |
| Propane > 100PPM | Valve_close.bat | Close a valve to the main propane tank when a gas leak is detected | maintankvalve |
| Oxygen > -10,000ppm/hour | EMERGENCY_REFILL.exe | Send a request to a vendor for emergency gas refill when oxygen levels are dropping rapidly | 184.244.38.11 1 |
| . | . | . | . |
| . | . | . | . |

| Rule | Commands | Command Description | Device ID |
|---|---|---|---|
| Fluid Tank Temp > 30C | Turn_on_cooling_fan.exe | Activate a cooling fan to cool down the fluid tank | CoolingFan001 |
| Fluid Tank Level < 20% | HeaterEcoMode_True.bat | Cause a hybrid heater to use more electricity when propane is low | E-hybrid home heater |
| Fluid Loss Rate > 2 G/h | Stove_Shutoff.exe | Shut off a gas powered stove when there may be a leak | 49:6E:BB:16:01 |
| Fluid Tank Pressure < 100psi | Purge.exe | Purge a pressurized tank when the pressure drops below 3 atm. | 192.168.1.105 |
| External Gas Detected > 100PPM | Valve_close.bat | Close a valve to the main fluid tank when a gas leak is detected | main tank valve |
| Temp Change > -10C/hour | EMERGENCY_REFILL.exe | Send a request to a vendor for emergency gas refill when outside temperatures are rapidly dropping | 184.2.44.38.111 |
| . | . | . | . |
| . | . | . | . |

ACTUATING AN IOT DEVICE ON A FLUID TANK OR GAS USAGE DEVICE REMOTE MONITORING NETWORK

RELATED APPLICATIONS

Under provisions of 35 U.S.C. § 119(e), the Applicant claims benefit of U.S. Provisional Application No. 63/299,534 filed on Jan. 14, 2022 and U.S. Provisional Application No. 63/299,536 filed on Jan. 14, 2022, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF THE DISCLOSURE

The present disclosure is generally related to remote monitoring network infrastructure and more particularly to Internet of Things (IoT) devices on a fluid tank or gas device remote monitoring network.

BACKGROUND

Many modern appliances, machines, and systems are not built to be monitored and controlled remotely, such as stovetops, heaters, or even door locks. Fortunately, some technologies have allowed remote access and control of such devices through wireless networks such as the internet or even local wireless mesh networks in and around a home or other structure.

However, many remote network-based technologies do not work with existing systems, but rather require a homeowner to upgrade to a "smart appliance" or connected appliance instead. Further, these remote networks often require access to the Internet and become difficult to troubleshoot when connectivity is at issue.

For some systems, such as propane tanks, which are often stored far from other systems for safety, a wireless connection may require one or more repeater nodes to extend the signal. When one of these nodes needs replacement or repair, it may be difficult to discern which node is the problem. As a result, technicians may need to access data directly and wirelessly from other nodes on the local mesh.

In addition, automated control of devices that rely on data from a monitored part of the system typically rely on correct and continuous data. For example, a ventilation system may be activated when fluid level data from a gas tank indicates a leak. Failure to transmit this data without error and/or interruption may be critical when a gas build-up is toxic or could cause combustion.

Accordingly, a reliable remote monitoring system to be used in the field of propane delivery and level maintenance for measurement of continuous values of liquid propane amount and battery voltages of the measurement nodes is desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for controlling an Internet of Things (IoT) device over a remote network based on substance measurements. The system includes a processor of a controller node connected to a sensor node and to the IoT device over a remote network; a memory storing machine-readable instructions that, when executed by the processor, cause the processor to: query an admin database for new measured parameter values acquired from the sensor node, responsive to at least one of the measured parameter values matching a rule, execute the rule, extract from the admin database recent entries corresponding to the sensor node, calculate rates of change for each of the measured parameter values, and send a control command to the IoT device based on at least one of the calculated rates of change.

Another embodiment of the present disclosure provides a method that includes one or more steps of querying, by a controller node, an admin database for new measured parameter values acquired from a sensor node; responsive to at least one of the measured parameter values matching a rule, executing the rule by the controller node; extracting from the admin database, by the controller node, recent entries corresponding to the sensor node; calculating, by the controller node, rates of change for each of the measured parameter values; and sending, by the controller node, a control command to an IoT device based on at least one of the calculated rates of change.

Another embodiment of the present disclosure provides a computer-readable medium including instructions for querying an admin database for new measured parameter values acquired from a sensor node; responsive to at least one of the measured parameter values matching a rule, executing the rule; extracting from the admin database recent entries corresponding to the sensor node; calculating rates of change for each of the measured parameter values; and sending a control command to an IoT device based on at least one of the calculated rates of change.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

DESCRIPTIONS OF THE DRAWINGS

The accompanying drawings, which are incorporated in and constitute a part of this disclosure, illustrate various embodiments of the present disclosure. The drawings may contain text or captions that may explain certain embodiments of the present disclosure. This text is included for illustrative, non-limiting, explanatory purposes of certain embodiments detailed in the present disclosure. In the drawings:

FIG. 2A illustrates an admin database for a gas usage device, consistent to the disclosed embodiments.

FIG. 2B illustrates an admin database for fluid tank management, consistent to the disclosed embodiments.

FIG. 4A illustrates an example of a device rules database for a gas tank, consistent to the disclosed embodiments.

FIG. 4B illustrates an example of a device rules database for a fluid tank, consistent to the disclosed embodiments.

DETAILED DESCRIPTION

Figure 1A:
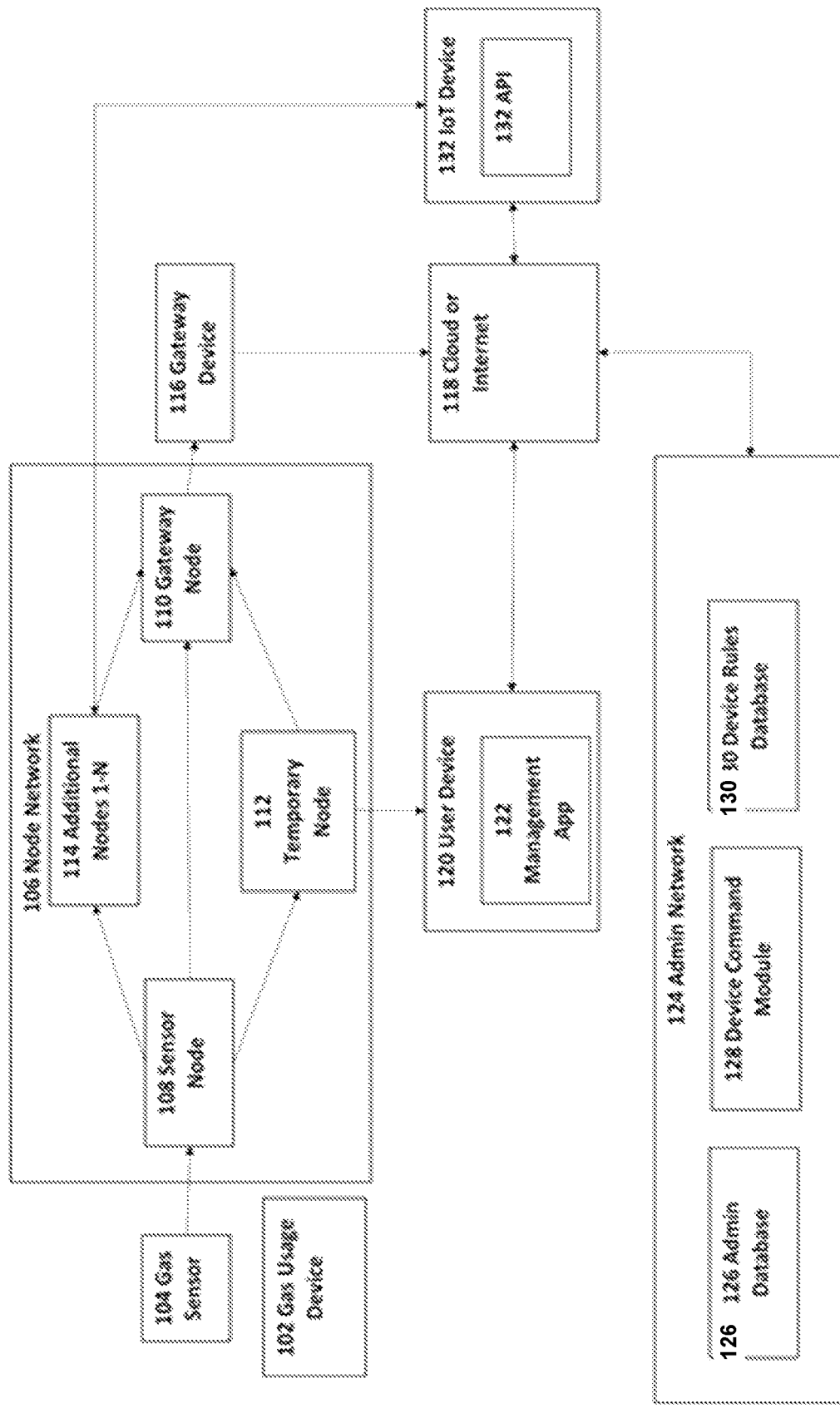
FIG. 1A illustrates a diagram of a system for gas usage device management, consistent to the disclosed embodiments.

Embodiments of the present disclosure will be described more fully hereinafter with reference to the accompanying drawings in which like numerals represent like elements throughout the several figures and in which example embodiments are shown. Embodiments of the claims may, however, be embodied in many different forms and should not be construed as limited to the embodiments set forth herein. The examples set forth herein are non-limiting examples and are merely examples among other possible examples.

As a preliminary matter, it will readily be understood by one having ordinary skill in the relevant art that the present disclosure has broad utility and application. As should be understood, any embodiment may incorporate only one or a plurality of the disclosed aspects of the disclosure and may further incorporate only one or a plurality of the -disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of a fluid tank remote monitoring network, embodiments of the present disclosure are not limited to use only in this context.

A system consistent with the disclosed embodiments may be used in any field requiring measurement of a remotely deployed site, mobile or stationary. Such measurement may be of a continuous value, such as the battery's voltage or the volume of liquid or gas in a tank. Such measurement may be a discrete value (binary or otherwise), such as the state of an indicator light, the presence or absence of liquid, audio levels above a threshold, or other defined discrete levels that a sensor of any type may be able to report.

FIG. 1A illustrates a diagram of a system for gas usage device management, consistent to the disclosed embodiments.

This system depicted in FIG. 1A, includes a gas usage device 102, which may be any device which uses a gas or may produce a gas. For example, a stovetop burner, a heater, a weed torch, a gas-powered generator, a liquid nitrogen ice-cream maker, or a helium balloon inflation nozzle. The gas usage device 102 does not need to be a device intended to produce gas. For example, a refrigerator may produce freon gas if there is a leak. A gas sensor 104 may be a device that detects at least one gas that may be used or produced by the gas usage device 102. For example, a gas sensor 104 may detect propane gas given off by a propane stove.

The sensor 104 may be connected to a gateway device 116 and/or a user device 120 by a network 106. In some embodiments, the network 106 may be formed as a node network, a hub and spoke network, or any other network architecture suitable for conveying data between the sensor 104 and the gateway device 116 and/or user device 120. In some embodiments, the network may include one or more additional devices, such as a repeater, a bridge, a router, a switch, and/or an extender. Data may be communicated between devices within the network using wired and/or wireless communication methods. For example, network communication may adhere to standards set forth by the institute for electrical and electronic engineers (IEEE) standards in the 802 working group, including IEEE 802.3 ethernet communication standards, 802.11 wireless local area network (WLAN) standards, 802.15 wireless personal area network (e.g., Bluetooth, ZigBee, etc.) standards, and/or the like. In embodiments, the network 106 may be a network of interconnected nodes that transmit data to or from other nodes or other system elements, such as the gas sensor 104, the gateway device 116, or the user device 120. Each node may represent, for example, a communication endpoint and/or a redistribution point within the network. A node may be an electronic device attached to a network and capable of creating, receiving, and/or transmitting information.

Nodes may be self-contained wireless communication devices that can communicate with other nodes and devices via wireless communication methods such as RFID, NFC, BlueTooth, Wi-Fi, Li-Fi, Radio Frequency (RF) communication, such as binary phase shift keying (BPSK) over ISM band spectra, etc. The nodes in the network 106 may be contained within other system elements such as the gateway device 116 or gas sensor 104. Nodes may be contained in a housing, such as a plastic container containing space for the electronics that comprise the node. A node may refer to the electronics that perform the communications or refer to both electronics and housing.

The network 106 may be comprised of at least three nodes: a sensor node 108, which is fixed near or at the sensor 104, a gateway node 110, which is fixed near or at the gateway device 116, and a temporary node 112, which is mobile or otherwise temporary. In some embodiments, the network 106 may include additional nodes 114 to create a mesh network, a hub and spoke network, a linear topology network, or any other network topology for communicating data among the network nodes, and/or to provide additional network functionality. Some of the additional nodes 114 may be alternate versions of the three nodes discussed above (e.g., the sensor node 108, the gateway node 110, and the temporary node 112). For example, there may be two nodes that are fixed near the sensor 104, both of which may be sensor nodes 108 such that if one node fails, the other node can still transmit data from the gas sensor 104 to other nodes on the network 106.

Additional nodes 114 may also be intermediate nodes that neither receive data directly from the gas sensor 104 nor transmit data directly to the gateway device 116, but instead transfer data from one node of the network to another node of the network to increase the range of the signal, ensure data integrity, and/or facilitate integration of the temporary node 112 into the network 106.

A sensor node 108 may refer to any node that receives data from the gas sensor 104. Data may be transmitted from the gas sensor 104 to the sensor node 108 via wired or wireless communication from the gas sensor 104. In other embodiments (e.g., when the gas sensor 104 is an analog sensor or is otherwise not capable of transmission), the sensor node 108 may be configured to read data from the sensor. There may be more than one sensor node 108, which node is the sensor node 108 may change based on connection strength between the sensor and the nodes in the network 106 and/or the connection strength among the nodes of the network. The sensor node 108 may be connected to the gas sensor 104, which may detect gas given off by the gas usage device 102. The sensor node 108 may be attached to a support, which allows the sensor node 108 to be mounted proximate to (e.g., directly on) the gas usage device 102 or the gas sensor 104.

Due to the obstacles, obstructions, and/or distance, the sensor node 108 may not be able to directly communicate with the gateway node 110. One or more additional nodes 114 may be placed in a location that allows the additional node 114 to relay wireless communications around obstacles and obstructions and/or across relatively large distances.

A gateway node 110 may be a node that sends data received from other nodes to the gateway device 116. In cases where there are few or no obstacles or obstructions, the gateway node 110 and the sensor node 108 may be the same node. The gateway device 116 and the gateway node 110 may be the same device, or one may contain the other. The gateway node 110 may transmit data from the network 106 to the gateway device 116. The gateway node 110 and the gateway device 116 may be adjacent, attached, or contained in the same enclosure. When data is received by the gateway device 116 or the admin network 124, the receiving element may acknowledge receipt, and the gateway node 110 may broadcast this success to one or more (e.g., all) nodes in range.

For example, if the sensor node 108 is out of range, the sensor node may still be waiting to receive an indication of success, and may re-try transmission at the next low-power-managed interval. However, an additional node 114 may accept the acknowledgment and relay it to the sensor node 108 at such time as their listening and transmission intervals overlap. This is the normal round trip of measurement data transmission and acknowledgment reception.

When the admin network 124 receives the data, the admin network may log the received data, run a trend analysis or other data analysis, and/or may initiate a service action based on the received data. The service action may include, as a non-limiting example, routing a propane delivery because the tank level is low, and other logistical factors contribute to the conclusion to make such delivery. Alternatively, the service action may be directed to network maintenance, such as alerting a user if any of the nodes in the network 106 reported that its battery is low enough to require replacement. Such replacement may be of the battery or may be of an entire node.

A temporary node 112, which may be a node that connects to the network 106 temporarily to send data to and/or receive data from other nodes. The data may be passed from the temporary node 112 to the gateway node 110 or other nodes in the network. The temporary node 112 may be mobile, such that one temporary node could join multiple networks 106 serially (e.g., one network at a time) based on one or more factors, including proximity. The temporary node 112 may send data directly to a user device 120 when access to the cloud or internet 118 is unavailable. For example, a service technician may carry a temporary node 112 to integrate with any network 106. The temporary node 112 may access data from the nodes of the network 106 and provide the data to a user device without being connected to the cloud or internet 118. The temporary node 112 may be a node that has augmented equipment allowing direct display of network parameters and/or command functions to the user (e.g., the service technician). Such a node may be useful for network maintenance, especially if the gateway mechanism is unavailable, rendering the local RF network "invisible" to the remote system.

If the gateway device 116 is operational and connected to the Internet, an alternate method for the service person to access data from the nodes may include accessing the network information via a user device 120 or a web page associated with the admin network 124 on an internet-connected device. The temporary node 112 may not be ported or carried by the service person but instead be carried by or integrated into the delivery or service vehicle. Valuable data may be obtained by understanding when this temporary node 112 may have joined a local network and/or how long the node was present in the network. If attached to a delivery vehicle, the temporary node 112 may have its own measurement module(s) and may provide data about the transfer from a tank on the vehicle to the gas usage device 102.

Zero or more additional nodes 114, which may facilitate the communication of data within the network 106, may be included as part of the network. For example, if the sensor node 108 is too far from the gateway node 110 to communicate, or there is an obstruction blocking communication, then additional nodes 114 may be used to repeat the signal and ensure the data from the sensor node 108 reaches the gateway node 110. A gateway device 116, which may be a device that allows for data to be sent through the cloud or internet 118, may also be connected to the network 106. The gateway device 116 may not be the only device between the network 106 and the cloud or internet 118. For example, the gateway device 116 may be a modem but there may also be a router that sends data to the modem which then sends data to the cloud or internet 118.

A cloud or Internet 118 may include a wired and/or a wireless communication network. The network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort and relies on sharing of resources to achieve coherence and economies of scale, like a public utility. At the same time, third-party clouds enable organizations to focus on their core businesses instead of expending resources on computer infrastructure and maintenance.

A user device 120 may be any device that can receive information from the cloud or internet 118 and/or from a temporary node 112, such as a laptop, smartphone, tablet, computer, or smart speaker. The user device 120 may be a device that can receive and/or send information to one or more nodes on the network 106. A management application 122, which may be an application on the user device 120, may be configured to display information associated with the gas usage device 102 that was obtained from the admin network 124 and/or directly from the network 106. The management application 122 may allow a user or service technician to affect elements of the system. For example, the management application 122 may be configured to turn on the gas usage device 102, cut off the flow of fluid or power to the gas usage device 102, reset the network 106, and/or the like. The management app 122 may allow a user to receive information from and control the system.

The user may be the owner or user of the gas usage device 102, a technician, an agent of a tank refilling company, a regulator, etc. The management app 122 may receive data from the admin network 124 if a connection to the network is available. Additionally or alternatively (e.g., if a connection to the admin network 124 is unavailable), the management app 122 may connect directly to the network 106. Connection to the network 106 may require proximity to at least one node on the network. This node may be the temporary node 112, which may be part of or connected to the user device 120. For example, the user device 120 may be a smartphone attached via a cable, such as a USB-C cable, to a temporary node 112. The temporary node 112 may sync up to (e.g., connect to) a nearby network 106 such that the user device 120 can obtain information from the network 106 through the connection with the temporary node 112.

The user device 120 and temporary node 112 may be the same device or may be housed in the same container. For example, a handheld tablet containing an RFID communication device that can receive data from the network 106 may serve as both the user device 120 and the temporary node 112. The management app 122 may then display the data from the admin network 124 or network 106 to the user. The user may be able to navigate through the management app 122 in order to view, format, and/or filter the data. The user may then be able to make changes to the system using the management app 122, for example, requesting early refueling, rebooting one or more nodes of the network 106, controlling which data is sent to the admin network 124, etc.

Additional elements of the system may also be controlled through the management app 122. For example, an emergency shut-off valve controlled remotely may be activated through the management app 122. Management may be automated through the management app 122. For example, when gas emitted by the gas usage device 102 begins to rise more rapidly than normal, an emergency shut-off valve may be activated without user intervention. The admin network 124, which may include a computer or network of computers, may receive data associated with the gas usage device 102 through the cloud or internet 118. This data may then be stored, sent, altered, and/or used in programs or modules. An admin database 126 may be used to store or otherwise contain data received by the admin network 124. The admin database 126 may contain a record of all data received from the gas sensor 104 over time. The admin database 126 may contain data from multiple instances of this system. The admin database 126 may also contain data from other sources, such as weather data, data from the gas usage device 102 manufacturers, data provided by a system user, etc. In some embodiments, the admin network 124 may also include a device command module 128, which may cause an IoT device 132 to execute a set of commands based on measurements from the gas sensor 104 or some other element of the system.

For example, the device command module 128 may cause a display panel to display the current gas usage device 102 emission rate and/or may cause a ventilator to be turned on when gas levels become too high. The IoT device 132 and the gas usage device 102 may be the same device. For example, an internet-connected stove may be automatically turned off when a gas sensor 104 in a kitchen detects a high level of propane gas, indicating that the same stove has been left on without being ignited, or is otherwise leaking propane. As one example of how the device command module 128 may be configured to command a gas usage device 102, a device rules database 130 may contain a set of commands and an associated trigger for those commands. The device command module 128 may search for a trigger that matches current data, then may execute the set of commands. An IoT device 132 may be a device connected to the cloud or internet 118 or the network 106. The IoT device 132 may receive commands from the admin network 124 (e.g., via the device command module 128) based on the trigger condition (e.g., gas detected by one or more gas sensors 104 or another system element, such as connection strength between the IoT device 132 and the network 106).

For example, an IoT device may be integrated into or may otherwise control a heater, stovetop burner, oven, water cooler, refrigerator, pump, reaction chamber, etc. An API 134, which may connect computers or pieces of software. The API 134 may be made up of different parts that act as available tools or services. The API 134 may include features of the IoT device such as subroutines, methods, requests, or endpoints.

Figure 1B:
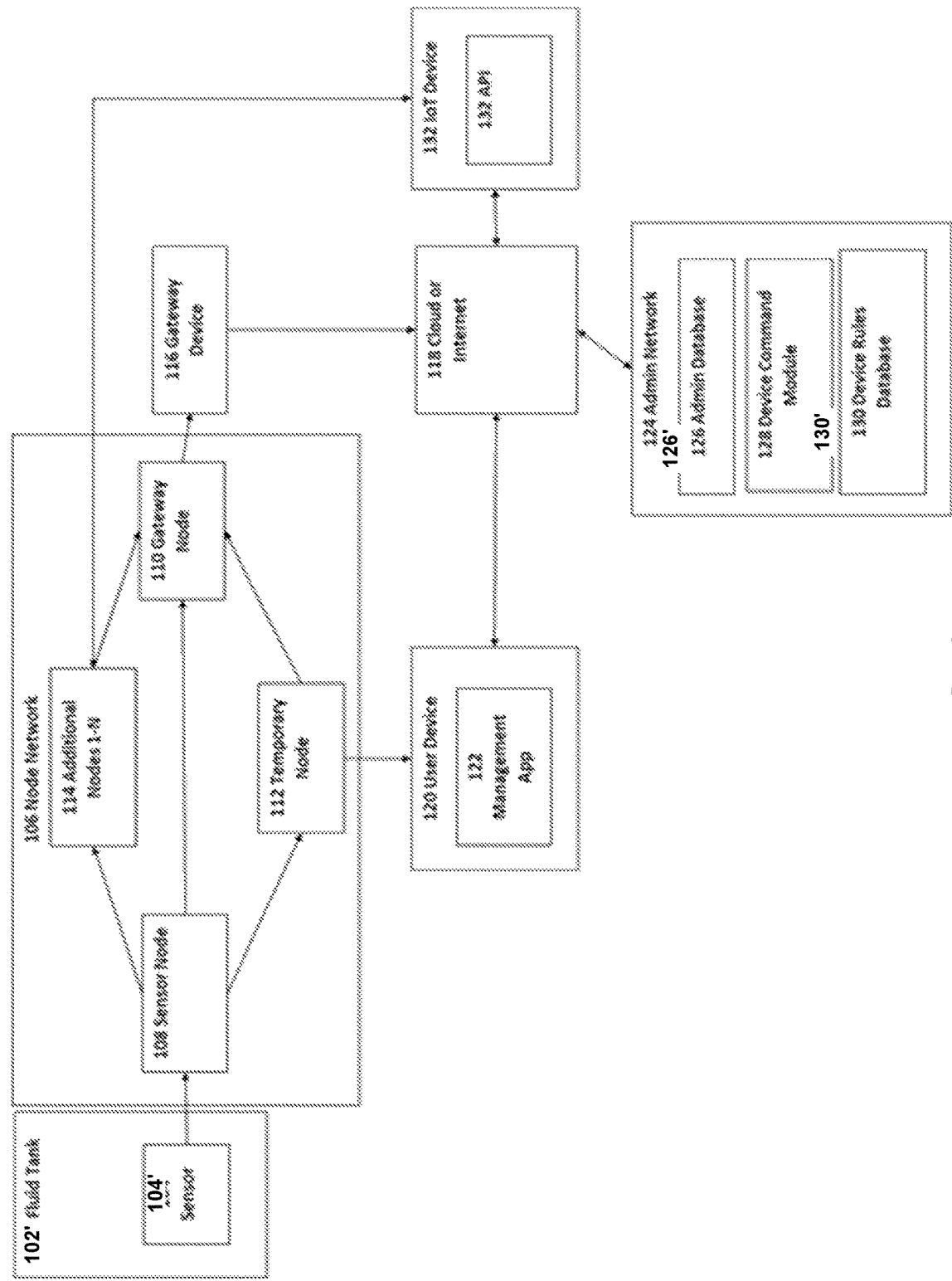
FIG. 1B illustrates a diagram of a system for fluid tank management, consistent to the disclosed embodiments.

FIG. 1B illustrates a diagram of a system for fluid tank management, consistent to the disclosed embodiments. The system of FIG. 1B is similar to that of FIG. 1A. Accordingly, like components have been designated with like reference numerals.

This system includes a fluid tank 102', which may be any container containing a fluid, such as a propane tank, an oxygen tank, a water bottle, a canister of liquid nitrogen, a bag of saline solution, and a container of pressurized carbon dioxide, etc.

A sensor 104' may be a device that detects at least one parameter of the fluid tank 102' such as fluid level, pressure, temperature, etc.; for example, the fluid level may be detected by a hall effect sensor that detects the movement of a magnet that is connected to a float inside a propane tank.

The sensor 104' may be connected to a gateway device 116 and/or a user device 120 by a network 106. In some embodiments, the network 106 may be formed as a node network, a hub and spoke network, or any other network architecture suitable for conveying data between the sensor 104' and the gateway device 116 and/or user device 120. In some embodiments, the network 106 may include one or more additional devices, such as a repeater, a bridge, a router, a switch, and/or an extender. Data may be communicated between devices within the network 106 using wired and/or wireless communication methods. For example, network communication may adhere to standards set forth by the institute for electrical and electronic engineers (IEEE) standards in the 802 working group, including IEEE 802.3 ethernet communication standards, 802.11 wireless local area network (WLAN) standards, 802.15 wireless personal area network (e.g., Bluetooth, ZigBee, etc.) standards, and/or the like. In embodiments, the network 106 may be a network of interconnected nodes that transmit data to or from other nodes or other system elements, such as the sensor 104, the gateway device 116, or the user device 120. Each node may represent, for example, a communication endpoint and/or a redistribution point within the network. A node may be an electronic device attached to a network and capable of creating, receiving, and/or transmitting information. Nodes may be self-contained wireless communication devices that can communicate with other nodes and devices via wireless communication methods such as RFID, NFC, Bluetooth, Wi-Fi, Li-Fi, Radio Frequency (RF) communication, such as binary phase shift keying (BPSK) over ISM band spectra, etc. The nodes in the network 106 may be contained within other system elements such as the gateway device 116 or sensor 104. In addition, nodes may be contained in a housing, such as a plastic container containing space for the electronics that comprise the node. A node may refer to the electronics that perform the communications or refer to both the electronics and housing. The network 106 may include three nodes: a sensor node 108, which is fixed near or at the sensor 102; a gateway node 110, which is fixed near or at the gateway device 116; and a temporary node 112, which is mobile or otherwise temporary. In some embodiments, the network 106 may include additional nodes 114 to create a mesh network, a hub and spoke network, a linear topology network, or any other network topology for communicating data among the network nodes, and/or to provide additional network functionality. Some of the additional nodes may be alternate versions of the three nodes discussed above (e.g., the sensor node 108, the gateway node 110, and the temporary node 112). For example, there may be two nodes that are fixed near the sensor 102, both of which may be sensor nodes 108 such that if one node fails, the other node can still transmit data from the sensor 104 to other nodes on the network 106. Additional nodes 114 may also be intermediate nodes that neither receive data directly from the sensor 104 nor transmit data directly to the gateway device 116, but instead transfer data from one node to another to increase the range of the signal, ensure data integrity, or facilitate the integration of the temporary node 112 into the network 106.

A sensor node 108, which may be a node that receives data from the sensor 104'. Data may be transmitted to the node via wired or wireless communication from the sensor 104. The sensor node 108 may be configured to read data from the sensor if the sensor is analog. There may be more than one sensor node 108, which node is the sensor node 108 may change based on connection strength between the sensor and nodes in the network 106. The sensor node 108 may be connected to the sensor 104', which may detect a parameter, such as fluid level, of the fluid tank 102'. For example, the sensor may read the position of the level gauge needle on the propane tank. The sensor node 108 may be attached to a support, which allows it to mount to the fluid tank 102' or the sensor 104'. Due to the obstacles and obstructions, the sensor node 108 may not be able to communicate with the gateway node 110 directly. One or more additional nodes 114 may be placed in a location that allows it to relay wireless communications around obstacles and obstructions. In cases where there are few or no obstacles or obstructions, the gateway node 110 and the sensor node 108 may be the same node.

A gateway node 110 may be a node that sends data received from other nodes to the gateway device 116. The gateway device 116 and the gateway node 110 may be the same device, or one may contain the other. The gateway node 110 may transmit data from the network 106 to the gateway device 116. The gateway node 110 and the gateway device 116 may be adjacent, attached, or contained in the same enclosure. When data is received by the gateway device 116 or the admin network 124, the receiving element may acknowledge receipt, and the gateway node 110 may broadcast this success to all nodes in range. If, for example, the sensor node 108 is out of range, it will still be waiting and may re-try transmission at the next low-power-managed interval. However, an additional node 114 may be able to accept the acknowledgment and relay it to the sensor node 108 at such time as their listening and transmission intervals overlap. This is the normal round trip of measurement data transmission and acknowledgment reception. When the admin network 124 receives the data, it may simply log these data, or run a trend analysis or other analysis, and may initiate a service action. Such action may be as routine as a propane delivery because the tank level is low, and other logistical factors contribute to the conclusion to make such delivery. Alternatively, the service action may be more along the lines of network maintenance, such as if any of the nodes in the network 106 reported that its battery is low enough to require replacement. Such replacement may be of the battery or may be of an entire node.

A temporary node 112 may be a node that temporarily connects to the network 106 to send and receive data from other nodes. This data may then be passed on to the gateway node 110 or other nodes in the network. These nodes may be mobile, such that one node could join multiple networks 106 based on proximity. The temporary node may be able to send data directly to the user device 120 when access to the cloud or internet 118 is unavailable. For example, a service technician may carry a temporary node 112 so that they can integrate with any network 106 and access data without being connected to the cloud or internet 118. The temporary node 112 may be a node that has augmented equipment allowing direct display of network parameters and command functions to the user. In this case, the user may be a service representative. Such a node may be required for network maintenance, especially if the gateway mechanism is unavailable, rendering the local RF network "invisible" to the remote system. If the gateway device 116 and internet connectivity is operational, an alternate method for the service person to use would be accessing the network information via a user device 120 or a web page associated with the admin network 124 on an internet-connected device. The temporary node 112 may not be ported or carried by the service person but instead the delivery or service vehicle. Valuable data may be obtained by understanding when this temporary node may have joined a local network and how long it was present. If attached to a delivery vehicle, it may have its own measurement module(s) and may be able to provide data about the transfer from a tank on the vehicle to the fluid tank 102'.

Zero or more additional nodes 114 may facilitate the communication of data within the network 106. For example, if the sensor node 108 is too far from the gateway node 110 to communicate, or there is an obstruction blocking communication, then additional nodes 114 may be used to repeat the signal and ensure the data from the sensor node 108 reaches the gateway node 110.

A gateway device 116 may be a device that allows for data to be sent through the cloud or internet 118. The gateway device 116 may not be the only device between the network 106 and the cloud or internet 118. For example, the gateway device 116 may be a modem but may also be a router that sends data to a modem that sends data to the cloud or internet 118.

A cloud or internet 118, which may be a wired or a wireless network. The network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort and relies on sharing of resources to achieve coherence and economies of scale, like a public utility. At the same time, third-party clouds enable organizations to focus on their core businesses instead of expending resources on computer infrastructure and maintenance.

A user device 120 may be any device that can receive information from the cloud or internet 118 such as a laptop, smartphone, tablet, computer, or smart speaker. The user device 120 may also be a device that can receive or send information to one or more nodes on the network 106.

A management app 122, which may be an application on the user device 120, can display information on the fluid tank 102 obtained from the admin network 124 or directly from the network 106. The management app 122 may also allow a user or service technician to affect elements of the system. For example, the management app 122 may be able to remotely drain the fluid tank 102, cut off the flow of fluid out of the fluid tank 102, reset the network 106, etc. The management app 122 may allow a user to receive information from and control the system. The user may be the owner or user of the fluid tank 102, a technician, an agent of a tank refilling company, a regulator, etc. The management app may receive data from the admin network 124 if a connection to the network is available. If a connection to the admin network 124 is unavailable, the management app 122 may connect directly to the network 106. Connection to the network 106 may require proximity to at least one node on the network. This node may be the temporary node 112, which may be part of, or otherwise connected to, the user device 120. For example, the user device may be a smartphone attached via USB-C cable to a temporary node 112. The temporary node 112 may sync up to a nearby node network 106 such that the user device 120 can obtain information from the network 106 through the connection with the temporary node 112. The user device and temporary node 112 may be the same device or may be housed in the same container. For example, a handheld tablet containing an RFID communication device that can receive data from the network 106. The management app 122 may then display the data from the admin network 124 or network 106 to the user. The user may be able to navigate through the management app 122 to view, format, and filter the data. The user may then be able to change the system using the management app 122, for example, requesting early refueling, rebooting a node or the network 106, controlling which data is sent to the admin network 124, etc. Additional elements of the system may also be controlled through the management app 122. For example, an emergency shut-off valve controlled remotely may be activated through the management app 122. Management may be automated through the management app 122. For example, when the fluid level in the fluid tank 102 begins to drop more rapidly than normal, an emergency shut-off valve may be activated without user intervention.

An admin network 124 may be a computer or network of computers that receives data on the fluid tank 102 through the cloud or internet 118. This data may then be stored, sent, altered, or used in programs or modules.

An admin database 126', which may contain data received by the admin network 124. The admin database 126' may contain a record of all data received on the fluid tank 102 over time. The admin database 126' may contain data from multiple instances of this system. The admin database 126 may also contain data from other sources such as weather data, fluid tank 102' manufacturer data, data provided by a system user, etc.

A device command module 128, which may cause an IoT device 132 to execute a set of commands based on measurements from the sensor 104' or some other element of the system; for example, the device command module 128 may cause a display panel to display the current fluid tank 102' level or may cause a heater to be turned down or off when fluid levels get too low.

A device rules database 130', which may contain a set of commands and an associated trigger for those commands. The device command module 128 may search for a trigger that matches current data, then may execute the set of commands.

An IoT device 132 may be a device connected to the cloud or internet 118 and/or the network 106. The IoT device 132 may receive commands from the admin network 124 based on a parameter of fluid tank 102' or another system element, such as connection strength between the IoT device 132 and the network 106. For example, an IoT device may be a heater, stovetop burner, oven, water cooler, refrigerator, pump, reaction chamber, etc.

An API 134, which may connect computers or pieces of software. The API 134 may be made up of different parts that act as available tools or services. In addition, the API 134 may include features of the IoT device such as subroutines, methods, requests, or endpoints.

Functioning of the admin database will now be explained with reference to FIG. 2A.

FIG. 2A shows an embodiment of the admin database 126 for use with the gas usage device 102 and the gas sensor 104 as shown in FIG. 1A. The admin database 126 may contain identifying information for a gas sensor 104. For example, a sensor ID, the make or model, and contact information for the owner or manager of the sensor or system the sensor is attached to. The admin database 126 may also contain data received at the admin network 124 about the gas level measured by the gas sensor 104. This data may be timestamped and may be saved in the database continuously, at regular intervals such as every 15 minutes, or at irregular intervals based on measured, calculated, and/or anticipated usage. The admin database 126 may also contain features of the gas usage device 102 that would be useful in determining normal gas levels in the air. Some of this data, such as normal gas levels, may be obtained from sources outside of the admin network 124, such as the manufacturer's website. The admin database 126 may contain additional data received from the network 106, such as temperature or weather data.

FIG. 2B shows another embodiment of the admin database 126' for use with the fluid tank 102' and the sensor 104' as shown in FIG. 1B. The admin database 126' may contain identifying information for a fluid tank 102'. For example, a tank ID, the make or model of the tank, the location of the tank, and contact information for the owner or manager of a tank. The admin database 126' may also contain the data received at the admin network 124 about the fluid level of the fluid tank 102' measured by the sensor 104'. This data may be timestamped and may be saved in the database continuously, at regular intervals such as every 15 minutes, or at irregular intervals based on measured, calculated, and/or anticipated usage. The admin database 126' may also contain features of the tank 102' that would be useful in determining when the tank will need to be filled, such as the total tank capacity. Some of this data, such as tank capacity, may be obtained from sources outside the admin network 124, such as the manufacturer's website. The admin database 126' may contain additional data received from the node network 106, such as temperature or weather data.

Figure 3A:
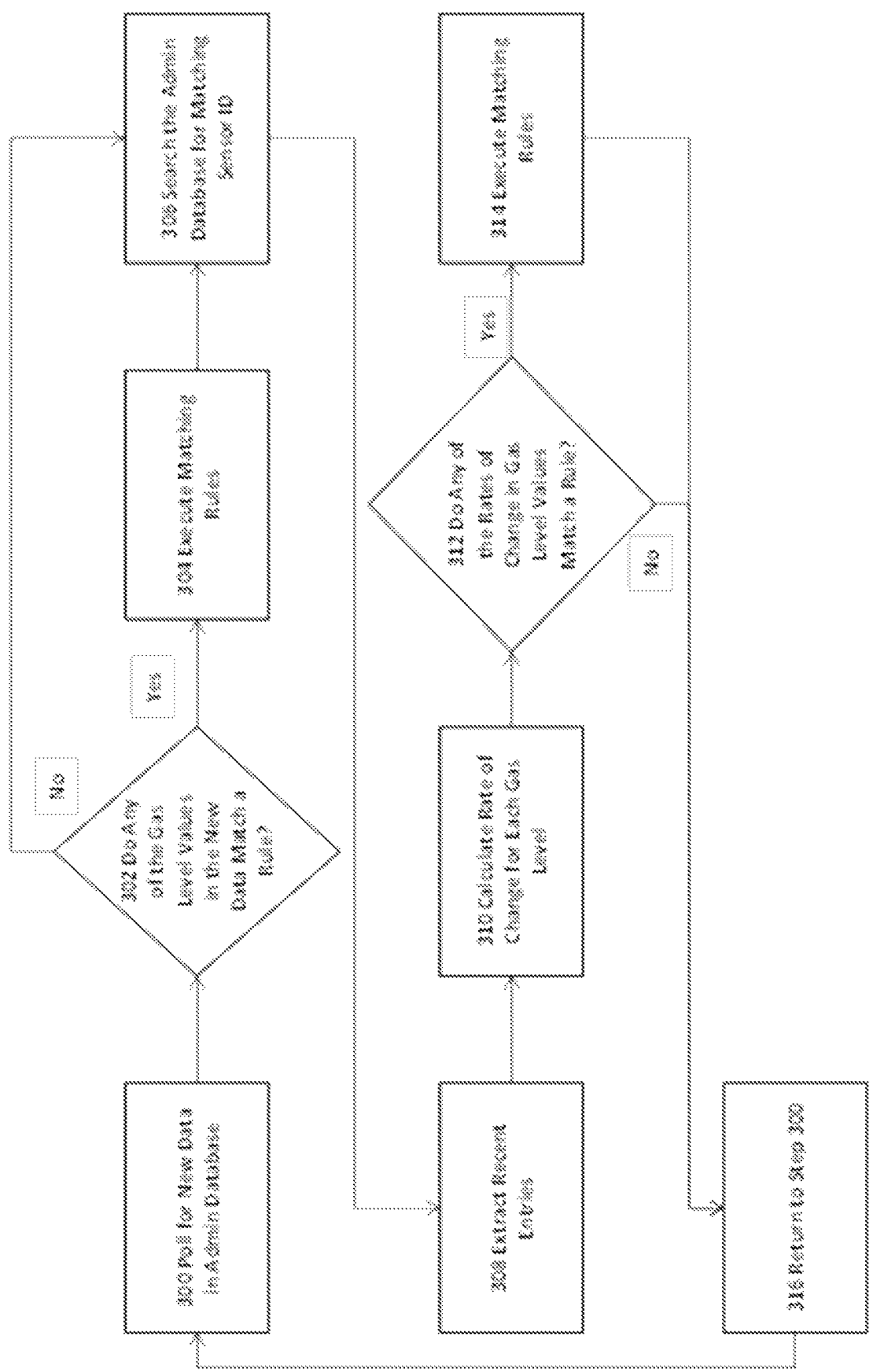
FIG. 3A illustrates a device command module process flow in case of the gas usage device, consistent to the disclosed embodiments.

FIG. 3A shows the functioning of the Device Command Module 128 when used with a gas usage device (e.g., the device 102). The process may begin at step 300 with the device command module 128 polling for new data in the admin database 126. In some embodiments the new data may correspond to data that has just been received by the admin network 124 that originated at the gas sensor 104. The gas sensor 104 may be located at or near the gas usage device 102 and measures a level (e.g., a concentration, an absolute amount, etc.) of one or more gasses in the air. The system may store the measured level data in the admin database 126. In some embodiments, the device command module 128 may run on the network 106, in which case data may be received directly from the gas sensor 104. In other embodiments, the new data may refer to data that was newly created or updated. Additionally or alternatively, new data may correspond to the latest data in the admin database 126, which may include predictive data such as temperature, humidity, wind speed, etc., from a weather service.

At step 302, the device command module 128 may search the device rules database 130 for each parameter in the new data entry and determine if any rules match the parameter values. For example, if the parameter for propane gas is 500 parts per million (ppm), that parameter would match a rule that triggers when the propane gas level is more than 100 ppm. There may be multiple rule matches for each parameter. For example, an oxygen level of 40% may match both a rule that triggers when the oxygen level is above 20% and a rule that triggers when the oxygen level is above 30%. Some rules may trigger based on multiple parameters. For example, a rule may trigger when carbon monoxide level is above 80 ppm or oxygen level is below 18%, or a rule may trigger when propane gas level is above 1000 pm and carbon dioxide level is above 1800 ppm.

If there are any matching rules (YES at step 302), the device command module 128 may execute the commands associated with those rules on the IoT device 132 with sensor ID associated with the commands at step 304. The device command module 128 may send the commands to the IoT device 132 with the associated sensor ID to be executed. For example, the gas sensor 104 detects 180 ppm of propane gas in the air. This propane level exceeds the 100 ppm threshold of a rule in the device rules database 130, which may indicate there is a gas leak. The associated commands would then be executed, which would cause the main valve of the gas usage device 102 to be closed. If there are no matching rules (NO at step 302) or after completing step 304, the device command module 128 may continue to step 306, where the device command module 128 may search the admin database for a sensor ID that matches the sensor ID from the new data. The data retrieved may correspond with all data from the gas usage device 102 with this sensor ID that has been recorded in the admin database 126.

In step 308, the device command module 128 may extract all recent entries (e.g., entries made within the last 10 minutes, the last hour, the last day, the last week, etc.). The time frame for recent entries may be static or dynamic, and may be set by an administrator of the system, a user of the system, or another module.

In step 310, the device command module 128 may calculate the rate of change for each parameter. As one non-limiting example, the rate of change may be calculated by taking the difference in a parameter's value between two entries and dividing that difference by the difference in time between the two entries. For example, if an entry has a propane level value of 2300 ppm and an entry taken an hour earlier has a propane level value of 2100 ppm, then the calculated rate of change may be +200 ppm/hour. If there are multiple entries for a parameter over the last hour, the device command module 128 may compare the earliest to the newest, compare the two most different values, or compare multiple sets of entries and take a statistical average.

At step 312, the device command module 128 may search the device rules database 130 for the calculated rate of change for each parameter and determine if any rules match the values. For example, if the parameter for oxygen level changed at a rate of −3%/hour, that parameter would match a rule that triggers when the oxygen level is dropping faster than 1%/hour. There may be multiple rule matches for each parameter. For example, a carbon monoxide level change of +40 ppm/hour might match both a rule that triggers when carbon monoxide level change is above 20 ppm/hour and a rule that triggers when the temperature change is above 30 ppm/hour. Some rules may trigger based on the rate of change of multiple parameters. For example, a rule may trigger when the propane level rises faster than 100 ppm/hour or methane level rises faster than 2 ppm/minute. Some rules may trigger based on a combination of fixed value and rate of change. For example, a rule may trigger when the propane level is above 1200 ppm, and the water vapor level is rising slower than 100 ppm/minute, indicating that the propane is not being burned at step 312.

If there are any matching rules (YES at step 312), the device command module 128 may proceed to step 314, where the device command module may execute the commands associated with those rules on the IoT device 132 with device ID associated with the commands. The device command module 128 may send the commands to the IoT device 132 with the associated sensor ID to be executed. For example, the gas sensor 104 records an oxygen level of 200,000 ppm at 8 PM and 185,000 ppm at 9 PM. This rate of change exceeds the −10,000 ppm/hour threshold of a rule in the device rules database 130, which may indicate oxygen levels are low, or build-up of other gasses is high. The associated commands would then be executed, which would cause an emergency refill request to one or more vendors that could refill an oxygen tank.

If there are no matching rules (NO in step 312) or following execution of the matching rules in step 314, the device command module 128 continues to step 316, where the device command module 128 may return to step 300.

Figure 3B:
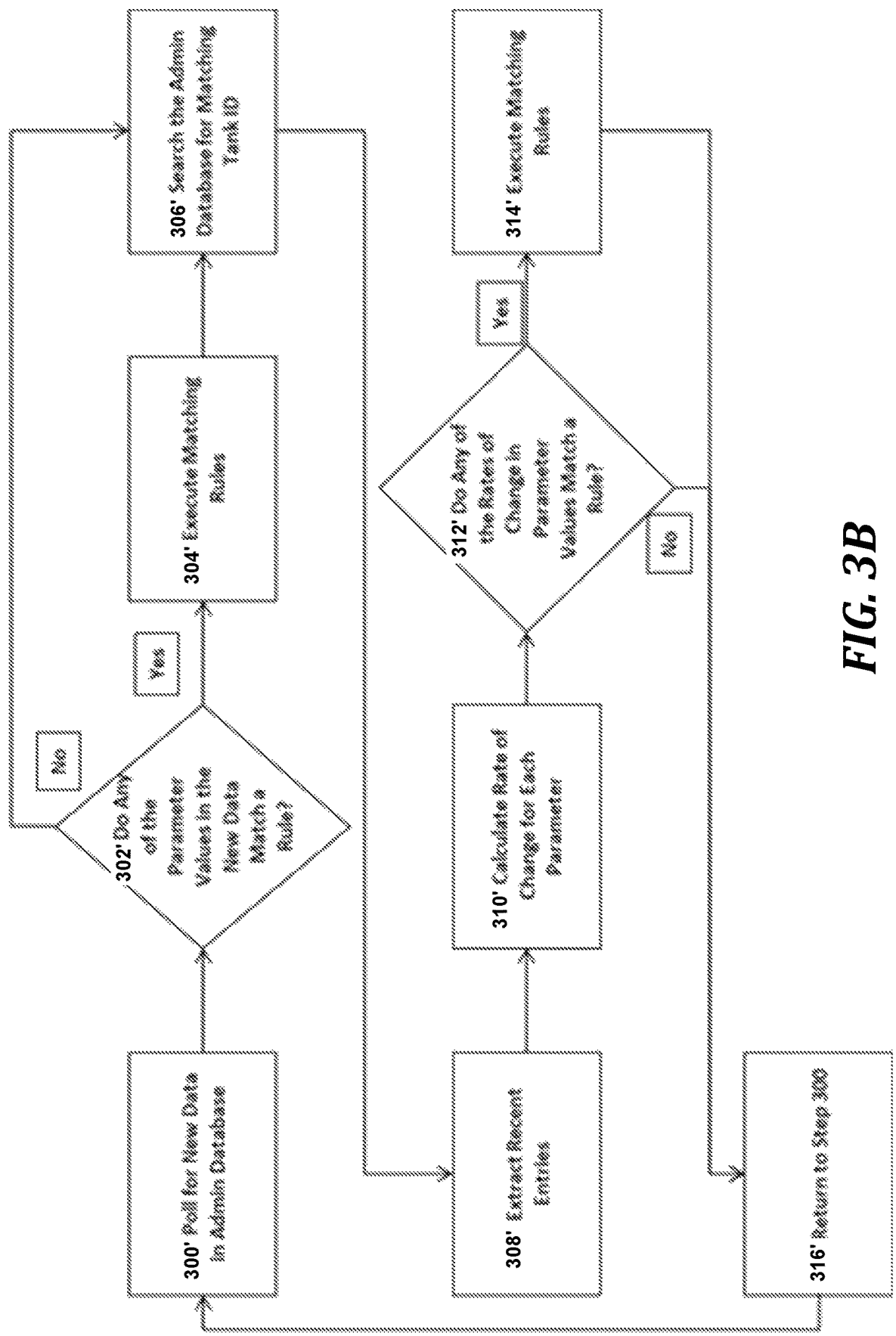
FIG. 3B illustrates a device command module process flow in case of the fluid tank management, consistent to the disclosed embodiments.

Functioning of the Device Command Module 128 when used with a fluid tank (e.g., the fluid tank 102') will now be explained with reference to FIG. 3B.

The process may begin at step 300' with the device command module 128' polling for new data in the admin database 126'. New data may correspond to data that has just been received by the admin network 124' that originated at the sensor 104'. New data may refer to data that was newly created or updated. New data may also correspond to the latest data in the admin database 126', which may include predictive data such as temperature, humidity, wind speed, etc., from a weather service.

At step 302', the device command module 128 may search the device rules database 130' for each parameter in the new data entry and determine if any rules match the parameter values.

For example, if the parameter for fluid level is 50 L, that parameter would match a rule that triggers when the fluid level is less than 100 L. There may be multiple rule matches for each parameter. For example, a temperature of 40 C might match both a rule that triggers when the temperature is above 20 C and a rule that triggers when the temperature is above 30 C. Some rules may trigger based on multiple parameters. For example, a rule may trigger when the fluid level is above 80% or pressure is above 250 psi, or a rule may trigger when the temperature is below 0 and humidity is above 50%.

If there are any matching rules (YES at step 302'), the device command module 128 may execute the commands associated with those rules on the IoT device 132 with device ID associated with the commands at step 304'. The device command module 128 may send the commands to the IoT device 132 with the associated device ID to be executed. For example, the sensor 104' is a gas detector, which detects 180 ppm of propane gas in the air. 180 ppm exceeds the 100 ppm threshold of a rule in the device rules database 130', which may indicate there is a gas leak. The associated commands would then be executed, which would cause the main valve of the fluid tank 102' to be closed.

If there are no matching rules (NO at step 302') or after executing the commands at step 304', the device command module 128 continues to step 306', where the device command module 128 may search the admin database for a tank ID that matches the tank ID from the new data. This tank ID may correspond with data from the fluid tank 102' with this tank ID that has been recorded in the admin database 126'.

At step 308', the device command module 128 may extract all recent entries (e.g., entries within the last 10 minutes, the last hour, the last day, the last week, etc.) from the admin database. The time frame for recent entries may be static or dynamic, and may be set by an administrator of the system, a user of the system, or another module.

The device command module 128 may calculate the rate of change for each parameter at step 310'. This rate of change may be calculated by, as a non-limiting example, taking the difference in a parameter's value between two entries and dividing that difference by the difference in time between the two entries. For example, if an entry has a temperature value of 23 C and an entry taken an hour earlier has a temperature value of 21 C, then the calculated rate of change may be +2 C/hour. If there are multiple entries for a parameter over the last hour, the device command module 128 may compare the earliest to the newest, compare the two most different values, or compare multiple sets of entries and take a statistical average.

In step 312', the device command module 128 may search the device rules database 130' for the calculated rate of change for each parameter and determine if any rules match the values. For example, if the parameter for fluid level changed at a rate of −3 L/hour, that parameter would match a rule that triggers when the fluid level is dropping faster than 1 L/hour. There may be multiple rule matches for each parameter. For example, a temperature change of +4 C/hour might match both a rule that triggers when the temperature change is above 2 C/hour and a rule that triggers when the temperature change is above 3 C/hour. Some rules may trigger based on the rate of change of multiple parameters. For example, a rule may trigger when the fluid level rises faster than 0.01 L/hour or pressure drops faster than 2 psi/minute. Some rules may trigger based on a combination of fixed value and rate of change. For example, a rule may trigger when the temperature is below 0 and humidity rises faster than 5%/hour, or a rule may trigger when the fluid level is less than 1000 L and dropping faster than 20 L/day.

If there are any matching rules (YES at step 312'), the device command module 128 may proceed to step 314', where the device command module may execute the commands associated with those rules on the IoT device 132 with device ID associated with the commands. The device command module 128 may send the commands to the IoT device 132 with the associated device ID to be executed. For example, the sensor 104' is a thermometer, which records a temperature of 11 C at 8 PM and −2 C at 9 PM. This rate of change exceeds the −10 C/hour threshold of a rule in the device rules database 130', which may indicate there is an impending snowstorm. The associated commands would then be executed, which would cause an emergency refill request to one or more vendors that could refill the fluid tank 102'.

If there are no matching rules (NO in step 312') or following execution of the matching rules in step 314', the device command module 128 may continue to step 316'. The device command module 128 may return to step 300, at step 316.

FIG. 4A displays an example of the Device Rules Database 130. The device rules database 130 may contain a set of rules and corresponding commands which may be sent to the IoT Device 132 to be executed. These commands may be stored as files such as .bat or .exe files and may be coded based on the API 134 of the IoT device 132. Each command may have a corresponding rule or triggering circumstance associated with it, such that when the rule is met, the corresponding command is executed. For example, a stovetop may be turned off when there is a suspected leak in the gas usage device 102 or pipe system. To accomplish this, the rule or triggering circumstance may be some threshold amount and/or concentration of gas in the air characteristic of a leak, and the set of commands would turn off the stovetop. A non-limiting description of some example commands is included in the figure. In embodiments, each command may be associated with a device ID, such as a MAC address, an IP address, a randomly assigned name, a user assigned name, etc., to identify the device acted on by the command.

FIG. 4B shows another example of the Device Rules Database 130' structure. The device rules database 130' may include a set of commands which may be sent to the IoT Device 132 to be executed. These commands may be stored as files such as .bat or .exe files, and may be coded based on the API 134 of the IoT device 132. Each command may have a rule or triggering circumstance associated with the command such that, when the rule is met, the corresponding command is executed. For example, a cooling fan may be turned off when a fluid tank reaches a temperature threshold. The rule or triggering circumstance would be a temperature measurement at the fluid tank, and the set of commands would turn on the cooling fan. A non-limiting description of some example commands and corresponding rules is included in the figure. Each command may be associated with a device ID such as a MAC address, an IP address, a randomly assigned name, a user assigned name, etc, used to identify the device acted on by the commands.

The functions performed in the processes and methods may be implemented in differing order. Furthermore, the outlined steps and operations are only provided as examples. Some of the steps and operations may be optional, combined into fewer steps and operations, or expanded into additional steps and operations without detracting from the essence of the disclosed embodiments.

What is claimed is:

1. A system for controlling an Internet of Things (IoT) device over a remote network based on substance measurements, comprising:
   a processor of a controller node connected to a sensor node and to the IoT device over the remote network based on the substance measurements; and
   a memory on which are stored machine-readable instructions that, when executed by the processor, cause the processor to:
   query an admin database for new measured parameter values acquired from the sensor node,
   responsive to a particular measured value, of the new measured parameter values from the sensor node,
   matching a rule, cause the IoT device associated with the sensor node to execute the rule,
   extract, from the admin database, recent entries corresponding to the sensor node,
   calculate rates of change for each of the new measured parameter values,
   determine one or more data points related to the new measured parameter values, and
   send a control command to the IoT device based on at least one of the calculated rates of change and at least one of the one or more data points,
   wherein the processor of the controller node is connected to a temporary node connected to the sensor node and configured to repeat signals from the sensor node.

2. The system of claim 1, wherein the sensor node is connected to a device comprising any of:
   a fluid tank; and
   a gas usage device.

3. The system of claim 1, wherein the instructions further cause the processor to determine if the at least one of the calculated rates of change matches a condition associated with an operation of the IoT device.

4. The system of claim 3, wherein the instructions further cause the processor to, responsive to the at least one of the calculated rates of change matching the condition, send the control command to the IoT device to adjust the operation of the IoT device based on the condition.

5. The system of claim 4, wherein the instructions further cause the processor to execute the rule matching to the condition to determine the control command to be sent to the IoT device.

6. A method for controlling an Internet of Things (IoT) device over a remote network based on substance measurements, comprising:
   querying, by a controller node, an admin database for new measured parameter values acquired from a sensor node;
   responsive to a particular measured value, of the new measured parameter values from the sensor node,
   matching a rule, cause the IoT device associated with the sensor node to execute the rule;
   extracting from the admin database, by the controller node, recent entries corresponding to the sensor node;
   calculating, by the controller node, rates of change for each of the new measured parameter values;
   determine, by the controller node, one or more data points related to the new measured parameter values;
   sending, by the controller node, a control command to the IoT device based on at least one of the calculated rates of change and at least one of the one or more data points; and
   connecting to a temporary node connected to the sensor node and configured to repeat signals from the sensor node.

7. The method of claim 6, wherein the sensor node is connected to a device comprising any of:
a fluid tank; and
a gas usage device.

8. The method of claim 6, further comprising determining if the at least one of the calculated rates of change matches a condition associated with an operation of the IoT device.

9. The method of claim 8, further comprising, responsive to the at least one of the calculated rates of change matching the condition, sending the control command to the IoT device to adjust the operation of the IoT device based on the condition.

10. The method of claim 9, further comprising executing the rule matching to the condition to determine the control command to be sent to the IoT device.

11. A non-transitory computer readable medium comprising instructions, that when executed by a processor, cause the processor to perform:
querying an admin database for new measured parameter values acquired from a sensor node;
responsive to a particular measured parameter value, of the new measured parameter values from the sensor node,
matching a rule, causing at least one Internet of Things (IoT) device associated with the sensor node to executing the rule;
extracting, from the admin database, recent entries corresponding to the sensor node;
calculating rates of change for each of the new measured parameter values;
determining one or more data points related to the new measured parameter values; and
sending a control command to the at least one IoT device based on at least one of the calculated rates of change and at least one of the one or more data points; and
connecting to a temporary node connected to the sensor node and configured to repeat signals from the sensor node.

12. The non-transitory computer readable medium of claim 11, comprising the instructions, that when executed by the processor, cause the processor to further perform:
determine if the at least one of the calculated rates of change matches a condition associated with an operation of the at least one IoT device.

13. The non-transitory computer readable medium of claim 12, comprising the instructions, that when executed by the processor, cause the processor to further perform:
responsive to the at least one of the calculated rates of change matching the condition, send the control command to the at least one IoT device to adjust the operation of the at least one IoT device based on the condition.

14. The non-transitory computer readable medium of claim 13, comprising the instructions, that when executed by the processor, cause the processor to further perform:
execute the rule matching to the condition to determine the control command to be sent to the at least one IoT device.

15. The non-transitory computer readable medium of claim 11, further comprising comprising the instructions, that when executed by the processor, cause the processor to further perform:
acquire the new measured parameter values from the sensor node connected to any of:
a fluid tank; and
a gas usage device.

* * * * *